United States Patent
Wellen (10) Patent No.: US 7,088,729 B2
(45) Date of Patent: Aug. 8, 2006

(54) DISTRIBUTED SCHEDULER FOR PACKET SWITCHES AND PASSIVE OPTICAL NETWORKS

(75) Inventor: Jeroen Wellen, Leusden (NL)

(73) Assignee: Lucent Technologies Inc., Murray Hill, NJ (US)

( * ) Notice: Subject to any disclaimer, the term of this patent is extended or adjusted under 35 U.S.C. 154(b) by 966 days.

(21) Appl. No.: 10/020,660

(22) Filed: Dec. 12, 2001

(65) Prior Publication Data

US 2002/0075884 A1 Jun. 20, 2002

(30) Foreign Application Priority Data

Dec. 14, 2000 (EP) .................................. 00311184

(51) Int. Cl.
*H04Q 11/04* (2006.01)
*H04Q 12/56* (2006.01)
(52) U.S. Cl. ..................................................... 370/412
(58) Field of Classification Search ................ 370/412, 370/413, 415, 416, 418
See application file for complete search history.

(56) References Cited

U.S. PATENT DOCUMENTS

| 5,367,518 A | 11/1994 | Newman |
| 5,519,837 A * | 5/1996 | Tran ............................. 710/111 |
| 5,870,396 A | 2/1999 | Abu-Amara et al. |
| 6,092,137 A * | 7/2000 | Huang et al. ................ 710/111 |
| 6,487,213 B1 * | 11/2002 | Chao ........................... 370/418 |

FOREIGN PATENT DOCUMENTS

EP 1 052 814 A2 11/2000

OTHER PUBLICATIONS

Prabhakar et al. "On the speedup required for combined input and output queued switching". IEEE. Aug. 16-21, 1998. p. 165.*
Electronic Letters, TBIT/s Switching Scheme For ATM/WDM Networks, Jan. 7, 1999.

* cited by examiner

*Primary Examiner*—Derrick Ferris (57) ABSTRACT

Scheduling system and method for scheduling data packets from an input port ($1_1 \ldots 1_i$) to an output port ($3_1 \ldots 3_o$), comprising virtual output queues ($6_1 \ldots 6_n$) being arranged to store data packets from the input port ($1_1 \ldots 1_i$) destined for a specific output port ($3_1 \ldots 3_o$). The scheduling system comprises a scheduling tree (10) having a plurality of comparison layers, each comparison layer being arranged for pair-wise comparing requests received from the associated virtual output queues ($6_1 \ldots 6_n$) in parallel and sending the request with a higher priority to a higher level comparison layer until a single request remains, the single request indicating the virtual output queue ($6_1 \ldots 6_n$) scheduled to send its data packet to the associated output port ($3_1 \ldots 3_o$).

14 Claims, 6 Drawing Sheets

DISTRIBUTED SCHEDULER FOR PACKET SWITCHES AND PASSIVE OPTICAL NETWORKS

FIELD OF THE INVENTION

The present invention relates to a scheduler for packet switches, and more specifically, to a method for scheduling data packets from a plurality of Input ports to at least one output port comprising the steps of storing data packets in a plurality of virtual output queues, a virtual output queue being arranged to store data packets from one of the plurality of input ports destined for a specific one of the at least one output port, and scheduling the plurality of virtual output queues.

DESCRIPTION OF THE RELATED ART

Scheduling packets in terabit switches and gigabit passive optical networks (PONs) requires a considerable amount of computation power. When a priority mechanism has to be deployed to manage traffic with different quality of service (QoS), the problem becomes even more complex. This complexity can be expressed as the total number of input queues in the system that needs to be scheduled per output port. i.e. the product of the number of input ports and the number of service classes. An algorithm is required to schedule packets of a large number of queues. according to their specific priority. The algorithm must be implemented efficiently in state-of-the-art technology, i.e. ASICs OR FPGAs.

The article 'A Cell Based MAC Protocol with Traffic Shaping and a Global FIFO Strategy.' by C.Blondia, O.Casals and J. Garcia, Proceedings of the RACE Open Workshop on Broadband Access, Nijmegen, The Netherlands, June 1993, discloses a medium access protocol using a request/permit mechanism deploying a common first-in-first-out (FIFO) buffer. Each network termination (NT) advertises its bandwidth requirement through requests, comprising information on the state of the queue in the NT. A medium access protocol allocates available bandwidth to various NT's by bandwidth allocation algorithm. NT's are informed about allocated bandwidth by means of permits. This algorithm for PONs (specifically asynchronous transfer mode (ATM) PON) only addresses a small number of queues (~64), inadequate for large systems (~1000 queues) with gigabit capacities. Moreover, additional switch functions are needed to connect the PON to a core network.

The article 'A Contention-Free Packet Scheduling Scheme for Provision of Quality-of-Service in Tbit/sec WDM Networks' by I. Elhanany, J. Nir. D. Sadot, Optical Networks Magazine, July 2000, discloses a scheduling scheme for packet switches. An algorithm has been proposed that claims in the order of $N*^2 \log(N)$ operations per packet slot period, in which N is the number of output ports or destinations (the article relates to an N×N switch). This method employs sequential assertion of the different input ports using a round robin procedure, including a prioritised-matching scheme per input port to comply with diverse quality of service requirements. For large number of queues this is still to slow. It also does not address PON's.

SUMMARY OF THE INVENTION

The present invention seeks to provide a scheduler for packet switches anti PON's which is able to schedule packets of a large number of queues, according to their specific priority. The number of queues is equal to the number of input ports, or equal to the product of number of input ports and number of service classes (or priority classes) in the case of management of data traffic with different quality-of-service requirements.

The present invention provides for a method according to the preamble defined above, in which the step of scheduling the plurality of virtual output queues comprises the steps of scheduling the virtual output queues associated with one of the at least one output port in parallel, by scheduling the virtual output queues associated with one of the at least one output port by means of a scheduling tree, the scheduling tree comprising at least one comparison layer for executing the steps of pair-wise comparing requests received from the associated virtual output queues in parallel, and sending the request with a higher priority to a higher level comparison layer until a single request remains, the single request indicating the virtual output queue scheduled to send its data packet to the associated output port.

The method according to the present invention has the advantage that a very large number of virtual output queues can be efficiently scheduled. The present method requires only $^2\log N$ operations for scheduling, N being the number of virtual output queues. It can be efficiently used for packet switches, but also for passive optical networks, by cascading the access to the shared media and the access to the output ports. The present method can be executed in parallel for all output ports of the associated packet switch or passive optical network.

In an embodiment of the present method, the request comprises an identification of the associated virtual output queue. This allows a direct identification of the virtual output queue which is granted access to a certain output port.

In a further embodiment, the comparison layer executes the further step of storing the request with a higher priority, and after receiving a permit from a higher order level, the permit comprising the single request, sending the permit to a lower level comparison layer in accordance with the stored request associated with the higher priority. This embodiment allows to simplify the assignment mechanism by preventing that the virtual output queue identification has to be transported in the scheduling tree. Of course, this back routing alternative requires a total of $2^2\log N$ operations for scheduling, which is still less than the state of the art scheduling schemes.

The pair-wise comparing requests may apply a fixed precedence for one of the two requests received, allowing a very simple implementation of the method with a more or less fixed port/service class combination. As an alternative, an alternating precedence for each of the two requests received may be applied, leading to a net effect that no precedence is granted to any of the virtual output queues to be scheduled. In a further alternative, the request comprises a priority level and the step of pair-wise comparing requests applies a comparison of the priority levels. This embodiment allows flexible programming of the virtual output queues at the cost of more complex comparison logic. The added complexity requires about $^2\log N_c$ additional logic circuitry, $N_c$ being the number of priority levels available.

In a still further embodiment of the present invention, the comparison layer executes the further step of transporting the data packet associated with the higher priority request to the higher level comparison layer. By employing this embodiment, a path for the data packets may be established between an input port and an output port, concurrently with the scheduling mechanism.

In a further aspect, the present invention relates to a scheduling system for scheduling data packets from a plurality of input ports to at least one output port, comprising virtual output queues being arranged to store data packets from one of the plurality of input ports destined for a specific one of the at least one output port. The scheduling system comprises a scheduling tree having a plurality of comparison layers, each comparison layer comprising at least one comparing element, the comparing element comprising two input gates and an output gate, the input gates of the comparing elements of the lowest level comparison layer being connected to the plurality of virtual output queues, the output gates of two comparing elements of a comparison layer being connected to the input gates of one comparing elements of a higher level comparison layer, and each comparing element being arranged to evaluate requests received at its input gates and provide the highest priority request at its output gate. The present scheduling system may be easily implemented by combinatory logic circuitry, and can e.g. be integrated with a cross-connect switch in a single ASIC. Also, the scheduling tree may be implemented in a distributed, extendable manner, e.g. in a two layer division, associated with a number of input ports, and associated with each of the output ports, and located on corresponding line cards.

To enable direct identification of the virtual output queue which is granted access to the output port, the request preferably comprises an identification of the associated virtual output queue.

In an embodiment of the present scheduling system the at least one comparing element comprises memory means for storing the request with a higher priority, and the comparing element is further arranged to receive a permit from a higher level comparison layer, the permit comprising the request having the highest priority at the highest level comparison layer, and to sending the permit to the comparing element of a lower level comparison layer in accordance with the stored request associated with the higher priority.

The at least one comparing element may be arranged to apply a fixed precedence or an alternating precedence for one of its two input gates. Alternatively, the request comprises a priority level and the at least one comparing element is arranged to compare the priority levels of the requests.

In a further embodiment the at least one comparing element comprises a data path for transporting a data packet associated with the highest priority request to the higher level comparison layer.

To be able to schedule access from a number of input ports to one of a number of output ports, a plurality of scheduling trees may be connected in series. This may be applied in passive optical networks, which require scheduling for access to the shared media (shared fibers) and for access to the output ports.

In further embodiment of the present scheduling system, the scheduling system comprises a plurality of scheduling trees associated with a first and a second output port. The scheduling system is arranged to activate the scheduling tree associated with the second output port if the first port is unavailable for the associated virtual output queue. This embodiment allows connectionless scheduling or protection switching, and can be implemented easily using additional logic circuitry.

BRIEF DESCRIPTION OF THE DRAWINGS

The present invention will be clarified in more detail using a number of exemplary embodiments with reference to the accompanying drawings in which.

DETAILED DESCRIPTION

Figure 1A:
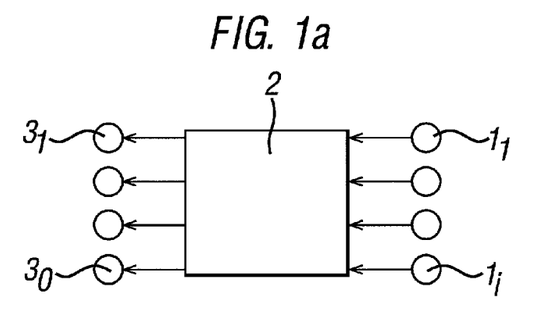
FIG. 1a shows a basic configuration of a switch connecting input ports to output ports.
Figure 1B:
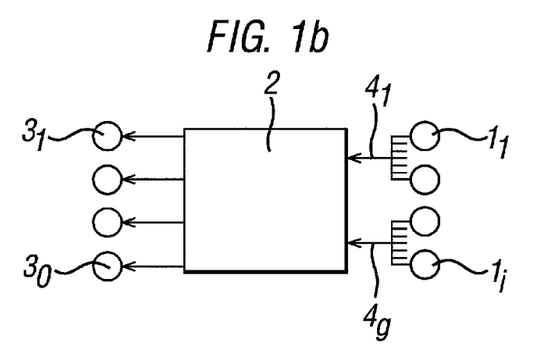
FIG. 1b shows a basic configuration of a passive optical network.

FIG. 1a shows a schematic diagram of an application of a scheduler for switching input data streams to specific output data streams. A switch 2 connects $N_i$ input ports $1_1 \ldots 1_i$ to $N_o$ output ports $3_1 \ldots 3_o$. Each of the input port $1_1 \ldots 1_i$ can be connected to any of the output ports $3_1 \ldots 3_o$ by the switch 2. In order to avoid collision of data from different input ports $1_1 \ldots 1_i$, a schedule function is needed to regulate access to each of the output ports $3_1 \ldots 3_o$. A similar function is necessary in a passive optical network (PON) which is shown in FIG. 1b, where next to the switch 2, the input ports $1_1 \ldots 1_i$ are connected to $N_g$ shared media $4_1 \ldots 4_g$. In the case of a PON, the schedule function not only has to regulate access to the output ports $3_1 \ldots 3_o$, but also access to the shared media $4_1 \ldots 4_g$. In the above mentioned cases, the switch 2 is considered to be single-stage non-blocking, i.e. the input ports $1_1 \ldots 1_i$ are directly connected to the scheduled output port $3_1 \ldots 3_o$. For the case of a PON, two separate schedulers may be implemented, one for the access to the shared media $4_1 \ldots 4_g$ and one for the access to the output ports $3_1 \ldots 3_o$. However, this requires additional input queues at the input of the switch 2 and reduces the end-to-end performance.

To avoid collision of data packets at the output ports $3_1 \ldots 3_o$, queuing of the data packets is performed. It is possible to queue data packets in a number of ways. The data packets may be stored at the output port $3_1 \ldots 3_o$ to which the packet is destined, but this implies that all offered data packets must be transported through the switch 2 first. For large port numbers, this would require unrealistic internal speeds. Another possibility is centralised queuing, which however requires large complex circuits, which are hard to implement for large numbers of input and output ports. A still further possibility is queuing of the data packets at the input ports $1_1 \ldots 1_i$. This approach has the disadvantage that a data packet addressed to an available output port $3_1 \ldots 3_o$ may be blocked by a data packet in the same queue that is waiting for another output port $3_1 \ldots 3_o$ (called head-of-line blocking). This may be overcome by employing a technique called virtual output queuing (VOQ), where data is stored in separate input queues dedicated to one output port $3_1 \ldots 3_o$, resulting in $N_iN_o$ virtual ports to be scheduled in the system.

When data packets with different priorities are to be transported from the input ports $1_1 \ldots 1_i$ (associated with different Quality of Service, QoS), also the scheduling function should take these priorities into account. To avoid blocking of high priority data packets by lower priority data packets, the virtual output queuing mechanism may be extended to include a plurality of $N_c$ priority classes, resulting in a number of queues to be scheduled equal to $N_iN_oN_c$. Scheduling of the different queue priorities requires fair weighting.

Figure 2:
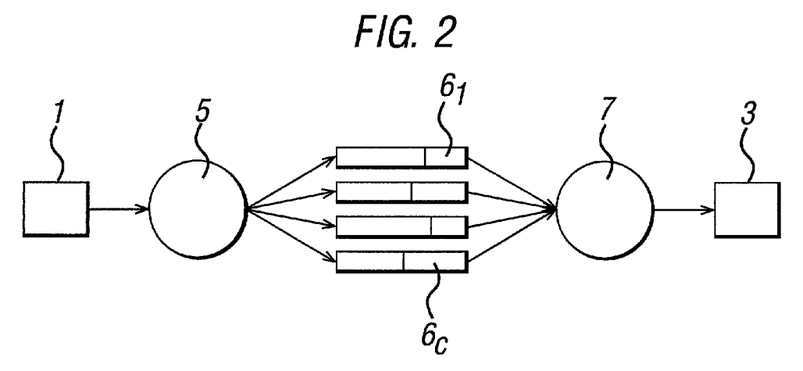
FIG. 2 shows in a schematic diagram, the scheduling of data traffic having a certain quality of service.

FIG. 2 shows the scheduling of data packets having different priorities for data traffic from one specific input port 1 to a specific output port 3. A classifier 5 evaluates an incoming data packet and assigns it to one of a plurality of virtual input queues $6_1 \ldots 6_c$, according to the priority class. The various queues $6_1 \ldots 6_c$ are input to scheduler 7 for access to the output port 3, including assessment of the priority class of the queues $6_1 \ldots 6_c$. This scheduling is performed for each of the $N_iN_c$ virtual output queues.

The process of scheduling performed by the scheduler 7 may be divided in three phases. First, the scheduler 7 polls the queues 6 (in total $N_iN_oN_c$ for a system with $N_i$ input ports, $N_o$ output ports and $N_c$ priority classes) for their access requests. Secondly, the scheduler 7 determines which queue 6 is granted access to an output port $3_1 \ldots 3_o$ based on the specific priority. Finally, the scheduler 7 informs which queue 6 is granted permission to send the associated data packet to the requested output port 3.

These steps are repeated for each packet in a certain data packet switch 2, and consequently, the whole procedure needs to last less than the associated slot time $T_s$. In modern data packet networks, the slot time $T_s$ is on the order of microseconds. As current processors operate with a cycle time in the order of several nanoseconds, this allows about 100 operations per time slot to schedule all virtual output queues. The most time consuming part of the scheduling is the assessment. Known scheduling techniques use polling or Round Robin techniques, but these are too slow for a large number of queues. The present invention allows the scheduling to be performed for large numbers of queues by hierarchically decomposing the assessment and weighting of the queue requests into a binary tree 10 as shown in FIG. 3.

Figure 3:
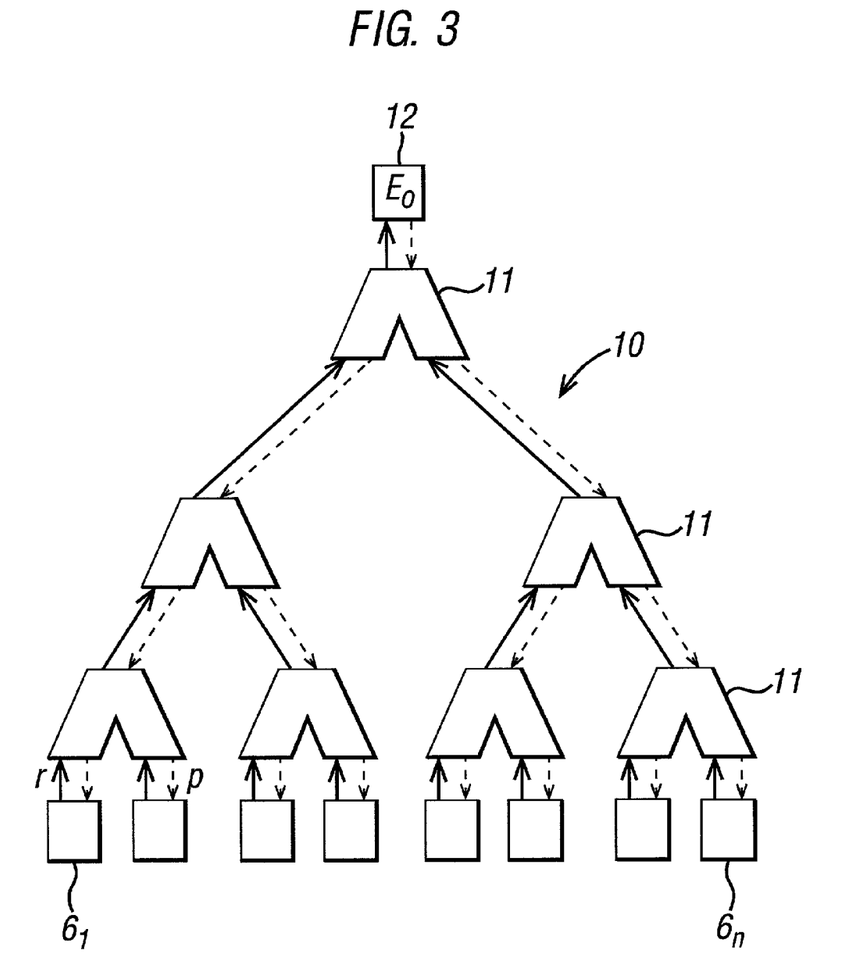
FIG. 3 shows a schematic diagram of a scheduling tree according to the present invention.

In FIG. 3 a single scheduling tree 10 is depicted for determining which of a number of virtual output queues $6_1 \ldots 6_n$ will gain access to a certain output port 3. A scheduling tree 10 as depicted is thus required for each of the output ports $3_1 \ldots 3_o$.

The scheduling tree 10 comprises a number of identical comparing elements 11, which may e.g. be implemented in combinatory logic (see below). Each comparing element 11 comprises two inputs and a single output. The comparing elements 11 are connected to each other in a tree-like manner, i.e. one of the inputs of a comparing element 11 at a higher level is connected to the output of a comparing element 11 at a lower level. At the lowest level, the inputs of the comparing elements 11 are connected to the virtual output queues $6_1 \ldots 6_n$. Every timeslot $T_s$, the virtual output queues $6_1 \ldots 6_n$ indicate their request r at one of the inputs of the comparing elements 11. Prevailing requests are forwarded to a higher level, until at the top level, the granted request for a specific output port 3 will emerge after $^2\log N$ gate operations. At the output of the top level comparing element 11, only one request for the specific output port 3 remains, and thus, the request can be directly assigned to the associated virtual output queue $6_1 \ldots 6_n$.

By choosing proper circuitry, the comparing elements 11 may be implemented to work in parallel, such that only $^2\log N$ (N being the number of (virtual) ports to be scheduled per output ports, i.e. $N=N_iN_c$ in the case of $N_i$ input ports and $N_c$ service classes) steps are necessary to determine which virtual output queue $6_1 \ldots 6_n$ gets access to the specific output port 3.

The comparing elements 1 may at any level decide which request r prevails on the basis of e.g. a fixed precedence, in which one of the inputs of the comparing element 11 takes priority. In the embodiment shown in FIG. 3, the priority of the tree entries would increase in left or right direction. This simplifies the implementation for systems with a more or less fixed port and service class combination.

Alternatively, the comparing elements 11 may be arranged to give alternating precedence to requests received, i.e. the priority swaps to the other input port every time a permit p is granted to one input port, resulting in no net precedence.

As a further alternative, a weighted precedence may be implemented in the comparing elements 11. The request r of each of the virtual output queues $6_1 \ldots 6_n$ should then comprise the priority level. In this case, flexible programming of the virtual output queues is possible, but it requires more complex logic (about a factor of $^2\log N_c$) to implement the comparing elements 11.

It is possible to prevent the identity of the virtual input queues $6_1 \ldots 6_n$ to be transported through the scheduling tree 10 and to simplify the assignment mechanism. This may be accomplished by having the comparing elements 11 arranged to store the associated intermediate results. In this manner, it is possible to back-route the permit p obtained at the output of the highest level comparing element 11 through the scheduling tree 10 to the right virtual output queue $6_1 \ldots 6_n$. This is indicated in FIG. 3 by the broken arrows.

It is also possible to arrange the scheduling tree 10 to include an integrated path section circuit with the comparing elements 11, thereby enabling the scheduler 7 to automatically establish a path for the data packets between the virtual output queues $6_1 \ldots 6_n$ and the output ports $3_1 \ldots 3_o$.

The scheduling tree 10 as described until now allows scheduling of data packets to one output port 3. As the scheduling tree 10 may be implemented to work in parallel for each output port $3_1 \ldots 3_o$ of a packet switch 2, the total number of steps necessary to schedule all $(N_iN_oN_c)$ virtual output queues $6_1 \ldots 6_n$ is also equal to $^2\log N_iN_c$.

Figure 4A:
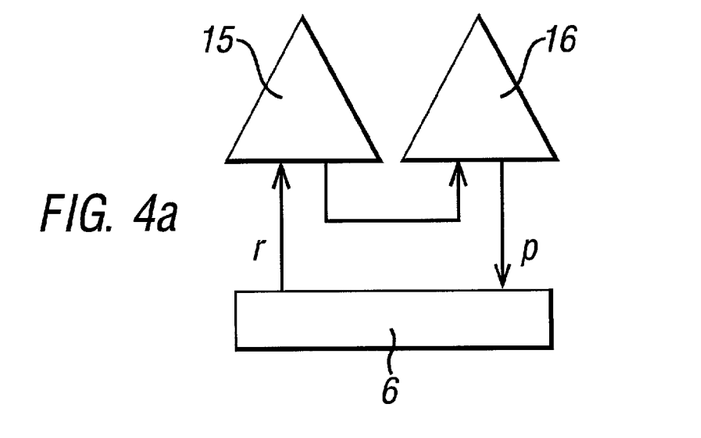
FIGS. 4a–c show schematic diagrams of embodiments of multi-stage scheduling arrangements of the present invention.

The present invention also allows to control the access to the shared media $4_1 \ldots 4_g$ in a passive optical network by putting two scheduling trees in sequence. FIG. 4a shows in simplified form, a multi-stage scheduling arrangement for a single queue 6 in for example a passive optical network. First, the input queues $1_1 \ldots 1_i$ are scheduled to the shared media $4_1 \ldots 4_g$ by a first scheduling tree 15 in which the back-routing arrangement is implemented, and, then, the shared media $4_1 \ldots 4_g$ are scheduled to the output ports $3_1 \ldots 3_o$ by a second scheduling tree 16. The two scheduling trees 15, 16 may thus be interconnected to perform an AND function.

Figure 4B:
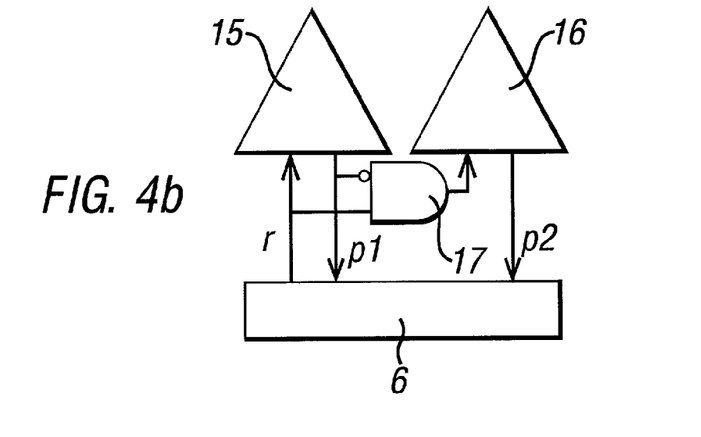

FIG. 4b shows another possible embodiment using a first scheduling tree 15 and a second scheduling tree 16, in which the permit $p_1$ obtained by the first scheduling tree 15 is inverted and input to an AND gate 17, the second input gate of AND gate 17 being connected to one of the virtual output queues 6, and the output of AND gate 17 being connected to the second scheduling tree 16. In effect this implements a logical OR function for access to alternative output ports, thus allowing scheduling of connectionless data packets.

The first scheduling trees 15 of all virtual output queues 6 should output a permit $p_1$ first, and then the permit $p_1$ should be processed by AND gate 17 and input to the second scheduling tree 16 to avoid double or unasked allocations.

Figure 4C:
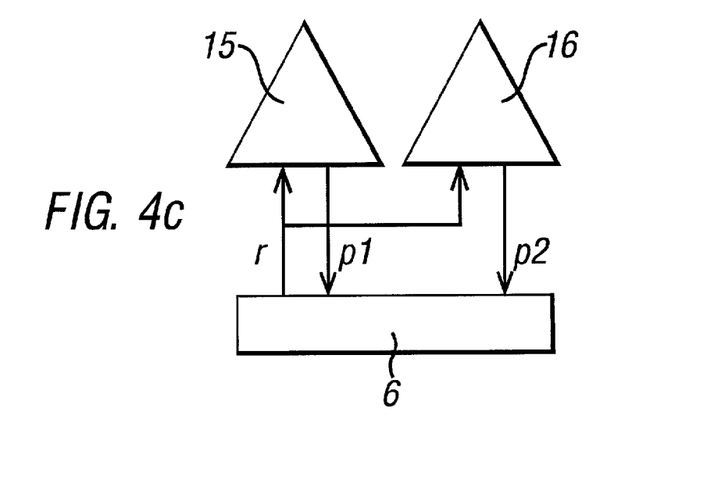

FIG. 4c shows a further possible embodiment using a first scheduling tree 15 and a second scheduling tree 16. A request from a virtual output queue 6 is input to both the first and second scheduling tree 15, 16. A permit $p_1$ is obtained from the first scheduling tree 15 or from the second scheduling tree 16. In effect, this also implements a logical OR function for access to alternative output ports, but now only allowing support of protection switching.

Figure 5A:
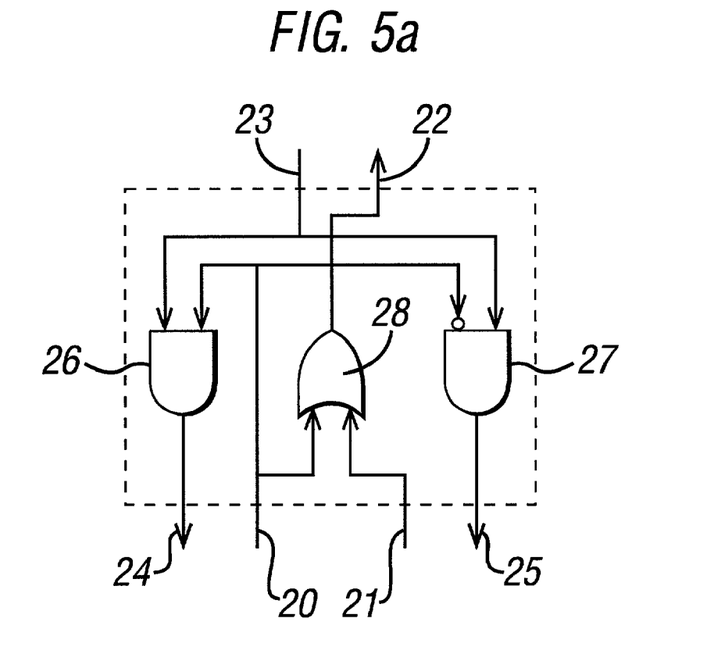
FIG. 5a shows a schematic diagram of a fixed precedence comparator with back routing of the permit.

FIG. 5a shows a simple block diagram of an exemplary implementation of the comparing element 11 of the scheduling tree 10 with combinatory logic. The comparing element 11 is implemented with a fixed precedence and back-routing of the permit p. A first input 20 and a second input 21 are connected to an OR element 28. Depending on the value of the request r input at the first or second input 20, 21 (being a high or low logical value), the output of the comparing element 11 (being the output of the OR element 28) reflects whether this specific comparing element 11 sends a request to a higher level comparing element 11. From the higher level comparing element 11, a permit value is received at a permit input 23 of the comparing element 11. This permit input 23 is connected to an input of a first AND gate 26 and a second AND gate 27. When this specific comparing element 11 receives a permit p from a higher level comparing element 11, the first and second AND gates 26, 27 will output the logical values present at their respective second inputs. The second input of AND gate 26 is connected to the first request input 20, and the second input of AND gate 27 is connected to the inverted value of the first request input 20. The outputs of the AND gates 26, 27 provide the permits (logical values) of the first and second input 20, 21, respectively. Effectively, this implements a fixed precedence for the first input 20.

Figure 5B:
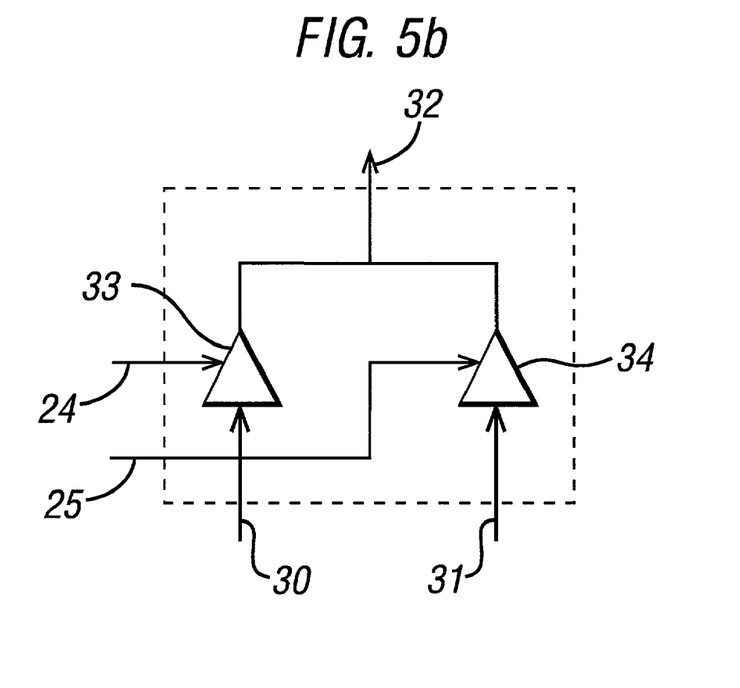
FIG. 5b shows a schematic diagram of an integrated path section for a scheduler according to the present invention.

FIG. 5b shows an exemplary embodiment of a path section circuit which may be integrated in the comparing element 11, next to the combinatory logic of FIG. 5a. The path section circuit comprises a first enabled gate 33 and a second enabled gate 34. The inputs of the first and second enabled gates 33, 34 receive the data packets 30, 31 associated with the first input 20, and second input 21, respectively. The outputs of the first and second enabled gates 33, 34 are connected and form the path section output 32. Th first and second enabled gates 33, 34 are controlled by gate inputs which receive the permit outputs 24, 25 of the combinatory logic of FIG. 5a. The combination of FIG. 5a and FIG. 5b provides a circuit element implementing the comparing element 11, which automatically sets up a connection between an input port 1 and an output port 3. This circuit element allows to construct a complete switch 2. For the person skilled in the art it will be clear that in the comparing element 11 gating and latching elements are necessary to provide adequate timing and synchronisation.

Figure 6:
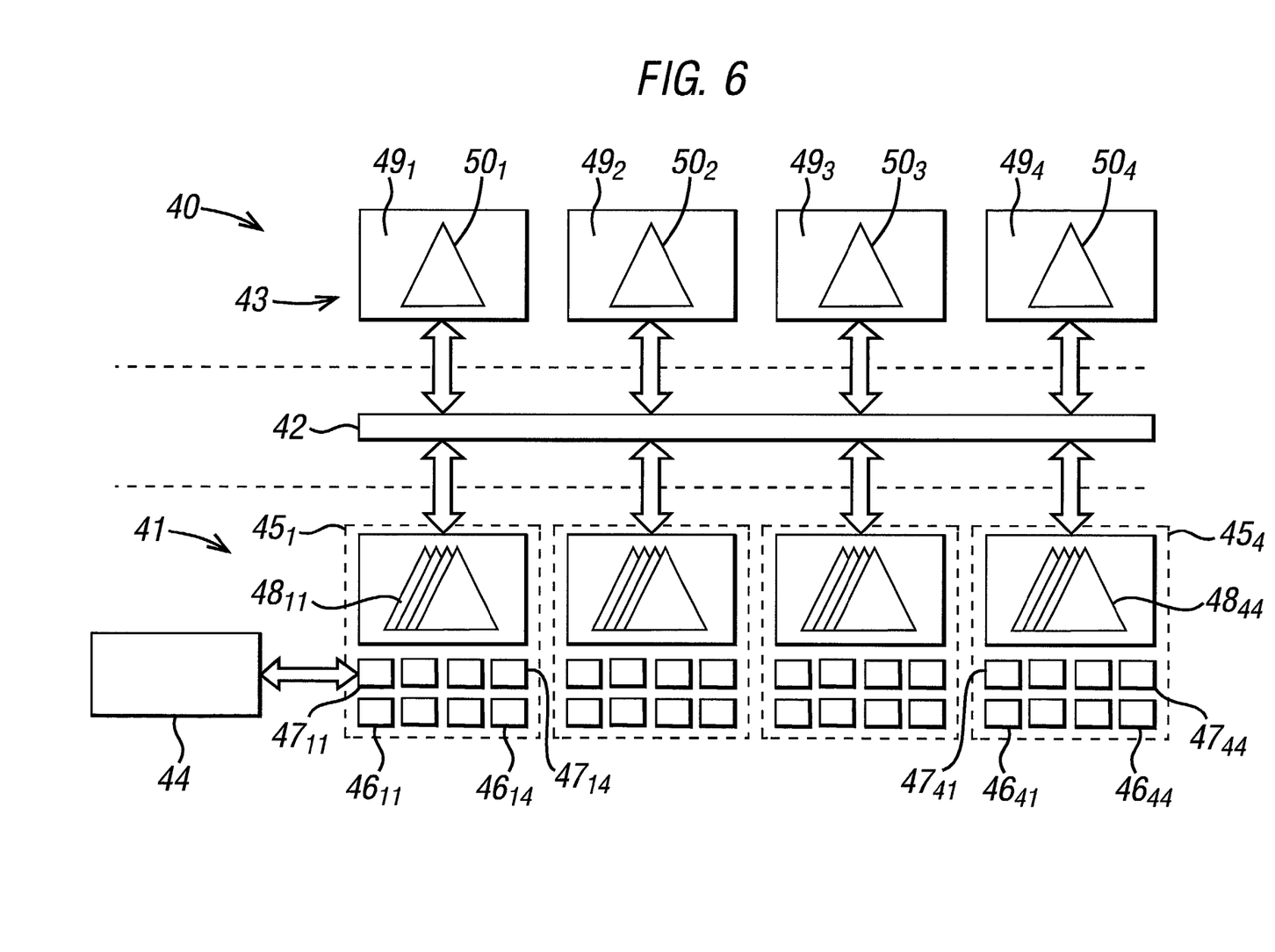
FIG. 6 shows a schematic diagram of an implementation of the present invention in a packet switch scheduler.

FIG. 6 shows a schematic diagram of an application of the present invention in a packet switch. In this case, the scheduling tree 10 may be distributed between input and output nodes, possibly cascaded through multiple levels and back planes to support physical dimensions involved. In the embodiment shown in FIG. 6, a packet switch scheduler 40 for a 16×4 switch 2, is divided in three parts, an input stage 41, a back plane 42 and an output stage 43.

The input stage 41 is divided in four input modules $45_1 \ldots 45_4$ connected to a management module 44. Also, the output stage 43 is divided into four output modules $49_1 \ldots 49_4$.

Each of the input modules $45_k$ has four input queues $46_{k1} \ldots 46_{k4}$ for receiving data packets from an associated input $1_1 \ldots 1_i$ and associated policing controllers $47_{k1} \ldots 47_{k4}$ for allowing an input queue $46_{k1} \ldots 46_{k4}$ to send its data packet after receiving a permit p from the scheduling tree 10. The scheduling tree 10 is divided into four input scheduling trees $48_{k1} \ldots 48_{k4}$ in each input module $45_k$ associated with one of the four output ports and an output scheduling tree $50_1 \ldots 50_4$ for each output module $49_1 \ldots 49_4$. The outputs from the input scheduling trees $48_{k1} \ldots 48_{k4}$ are connected to the back plane 42, which connects an output from an input scheduling tree $48_{k1} \ldots 48_{k4}$ to the associated output scheduling tree $50_1 \ldots 50_4$. The management module 44 controls a policing function and other timing and synchronisation function. The policing function may also be implemented in a distributed manner, but should always be positioned between the input queues $46_{k1} \ldots 46_{k4}$ and the input scheduling trees $48_{k1} \ldots 48_{k4}$.

In the embodiment shown in FIG. 6, special provisions may be present, e.g. to allow loop back of top level requests directly in the request of an input queue 46 or to allow protection switching.

Figure 7:
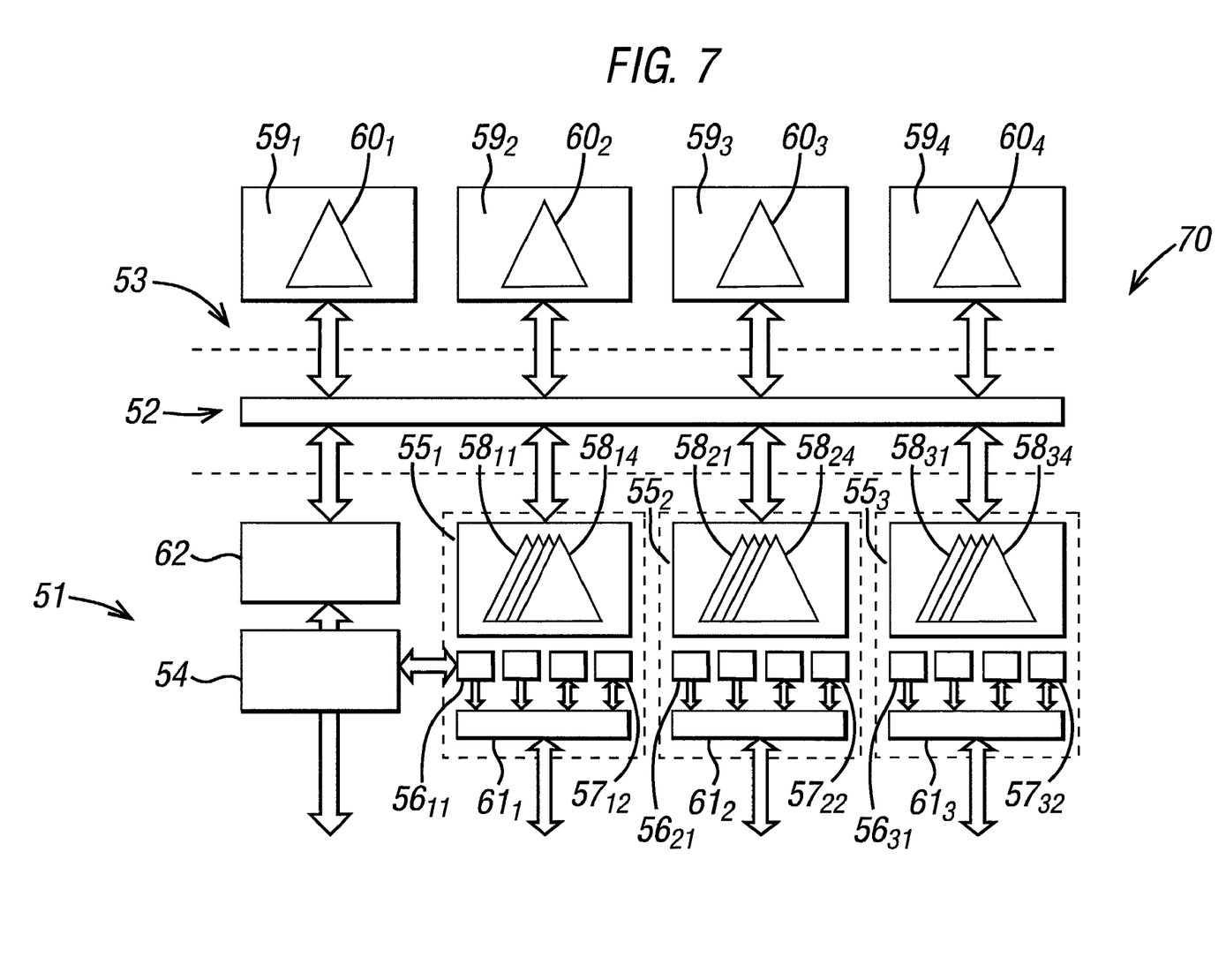
FIG. 7 shows a schematic diagram of a further implementation of the present invention in a passive optical network scheduler.

FIG. 7 shows a schematic diagram of an implementation of a scheduler 70 for implementation in a passive optical network (PON). The main difference between a packet switch scheduler 40 as depicted in FIG. 6 and a PON scheduler 70 as depicted in FIG. 7 is that the PON scheduler 70, next to having an additional assessment stage for the shared media $4_1 \ldots 4_g$ (see FIG. 1b and description above), is not directly connected to the queues of remote optical network units (ONU). Also, the PON scheduler 70 will, in general, not be equipped with an integrated path section as depicted in FIG. 5b, but will control the access to one or more shared media $4_1 \ldots 4_g$ which are connected to the output ports $3_1 \ldots 3_o$ by a separate (optical) cross connect. FIG. 7 shows that the PON scheduler 70 is also divided in an input stage 51, a back plane 52 and an output stage 53. The function and structure of the output stage 53 and back plane 52 are similar to those of the output stage 43 and back plane 42, respectively of the packet switch scheduler 40. The input stage 51, however, includes the additional shared media stage and an input/output (I/O) back plane $61_1 \ldots 61_3$ for each input module $55_1 \ldots 55_3$, for receiving remote requests and sending remote permits to the ONU's of the PON.

In order to schedule queues residing at remote optical network units, the scheduler 70 must provide communication means to support the assessment and assignment phases of the scheduling process. Although possible, it is not feasible to distribute the scheduling tree 10 across the PON itself as no equipment in the field operates at the link level. In the embodiment presented, this is solved by introducing queue proxies 56 at a central location. In FIG. 7, two queue proxies $56_{k1} \ldots 56_{k2}$ for each input module $55_k$ are shown as an example. The queue proxies $56_{k1} \ldots 56_{k2}$ are usually created for ONU's which require a certain fixed bandwidth for their data traffic. In order to prevent long round trip delays for deterministic data traffic with a high service quality (high priority), these queue proxies $56_{k1} \ldots 56_{k2}$ may generate requests independently to support the remote queue. Bursty traffic is handled similarly to the data packets in the packet switch 40 shown in FIG. 6, i.e. an ONU sending this kind of data traffic has to submit requests to the PON scheduler 70. Permits received from the input scheduling trees $58_{k1} \ldots 58_{k4}$ are sent back to the remote ONU's via the I/O back planes $61_1 \ldots 61_3$.

In addition, a PON scheduler 70 has to be equipped to handle maintenance functions for the PON, controlled by OAM and ranging block 62, especially when ranging is required to initialise new ONU's. For these purposes, a dedicated queue may be configured having top priority, so that it is possible to claim subsequent timeslots whenever the ranging function demands a silent period.

The queue proxies $56_{k1} \ldots 56_{k2}$ may be implemented relatively simple using the fixed precedence schemes as shown and described in relation to FIG. 5*a*. In this case, the request r from a queue proxy $56_{k1} \ldots 56_{k2}$ will only involve a single logical value ('0' or '1') and the local queuing functions may be implemented using ordinary counters indicating the outstanding requests.

The invention claimed is:

1. Method for scheduling data packets from a plurality of input ports to at least one output port comprising the steps of:
   storing data packets in a plurality of virtual output queues, a virtual output queue being arranged to store data packets from one of the plurality of input ports destined for a specific one of the at least one output port; and
   scheduling the plurality of virtual output queues,
   wherein
   the step of scheduling the plurality of virtual output queues comprises the steps of:
   scheduling the virtual output queues associated with one of the at least one output port in parallel, by scheduling the virtual output queues associated with one of the at least one output port by means of a scheduling tree,
   the scheduling tree comprising at least one comparison layer for executing the steps of:
   pair-wise comparing requests received from the associated virtual output queues in parallel; and
   sending the request with a higher priority to a higher level comparison layer until a single request remains, the single request indicating the virtual output queue scheduled to send its data packet to the associated output port;
   in which the comparison layer executes the further step of storing the request with a higher priority, and after receiving a permit from a higher order level, the permit comprising the single request, sending the permit to a lower level comparison layer in accordance with the stored request associated with the higher priority.

2. Method according to claim 1, in which the request comprises an identification of the associated virtual output queue.

3. Method according to claim 1, in which the step of pair-wise comparing requests applies a fixed precedence for one of the two requests received.

4. Method according to claim 1, in which the step of pair-wise comparing requests applies an alternating precedence for each of the two requests received.

5. Method according to claim 1, in which the request comprises a priority level and the step of pair-wise comparing requests applies a comparison of the priority levels.

6. Method according to claim 1, in which the comparison layer executes the further step of transporting the data packet associated with the higher priority request to the higher level comparison layer.

7. Scheduling system for scheduling data packets from a plurality of input ports to at least one output port, comprising virtual output queues being arranged to store data packets from one of the plurality of input ports destined for a specific one of the at least one output port, wherein
   the scheduling system comprises a scheduling tree having a plurality of comparison layers, each comparison layer comprising at least one comparing element, the comparing element comprising two input gates and an output gate, the input gates of the comparing elements of the lowest level comparison layer being connected to the plurality of virtual output queues, the output gates of two comparing elements of a comparison layer being connected to the input gates of one comparing element of a higher level comparison layer, and each comparing element being arranged to evaluate requests received at its input gates and provide the highest priority request at its output gate;
   in which the at least one comparing element comprises memory means for storing the request with a higher priority, and the comparing element is further arranged to receive a permit from a higher level comparison layer, the permit comprising the request having the highest priority at the highest level comparison layer, and to sending the permit to the comparing element of a lower level comparison layer in accordance with the stored request associated with the higher priority.

8. Scheduling system according to claim 7, in which the request comprises an identification of the associated virtual output queue.

9. Scheduling system according to claim 7, in which the at least one comparing element is arranged to apply a fixed precedence for one of its two input gates.

10. Scheduling system according to claim 7, in which the at least one comparing element is arranged to apply an alternating precedence for its two input gates.

11. Scheduling system according to claim 7, in which the request comprises a priority level and in which the at least one comparing element is arranged to compare the priority levels of the requests.

12. Scheduling system according to claim 7, in which the at least comparing element comprises a data path for transporting a data packet associated with the highest priority request to the higher level comparison layer.

13. Scheduling system according to claim 7, comprising a plurality of scheduling trees connected in series.

14. Scheduling system according to claim 7, comprising a plurality of scheduling trees associated with a first and a second output port, the scheduling system being arranged to activate the scheduling tree associated with the second output port if the first port is unavailable for the associated virtual output queue.

* * * * *